INVENTORS
ROBERT L. BRONNES
RAY C. HUGHES
RICHARD C. SWEET

BY

AGENT

United States Patent Office 3,464,725
Patented Sept. 2, 1969

---

3,464,725
HERMETIC ELECTRICAL LEAD-IN ASSEMBLY
Robert L. Bronnes, Irvington, Richard C. Sweet, North Tarrytown, and Ray C. Hughes, Ossining, N.Y., assignors to U.S. Philips Corporation, New York, N.Y., a corporation of Delaware
Original application Nov. 26, 1965, Ser. No. 510,017. Divided and this application Nov. 7, 1967, Ser. No. 681,962
Int. Cl. F16b 11/00; C03c 27/04
U.S. Cl. 287—189.365          3 Claims

ABSTRACT OF THE DISCLOSURE

A hermetic electrical lead-in assembly consisting of a metal-to-ceramic seal using a triple bonding layer of titanium, platinum and steel.

---

This application is a division of application Ser. No. 510,017, filed Nov. 26, 1965, now U.S. Patent No. 3,371,406 which is a continuation-in-part of application Ser. No. 301,866, filed Aug. 13, 1963, now U.S. Patent No. 3,412,455.

This invention relates to an hermetic electrical lead-in assembly and method of making the same. More particularly, the invention relates to a method of forming a hermetic seal between a metal conductor and a tubular ceramic member.

In our copending application, we have described a technique for making a hermetic seal between non-metals or between a non-metal and a metal, in which an active metal such as molybdenum, tungsten, manganese, iron, cobalt or nickel is sputtered onto the surface of the non-metal, for example a ceramic such as alumina. This metal layer is then covered with a metal of the platinum group which protects the more active metal against oxidation and permits the metallized non-metal surface to be brazed to a metal.

Although this metallization will withstand the erosive action of the molten copper, we have found it advantageous to apply a final metal coating of stainless steel to provide an improved compatability with respect to the braze alloy between the metallized ceramic and the metal to which it is to be joined.

Thus, in accordance with our invention, a tubular ceramic member is metallized by cathodic sputtering with successive layers of titanium, platinum and stainless steel. The metallized ceramic is then assembled with suitable metal parts, all of which are then brazed together with copper, or other suitable braze metal or alloy in vacuum, hydrogen, cracked ammonia, or other non-oxidizing atmosphere by heating to the melting point of the braze metal.

Figure 1:
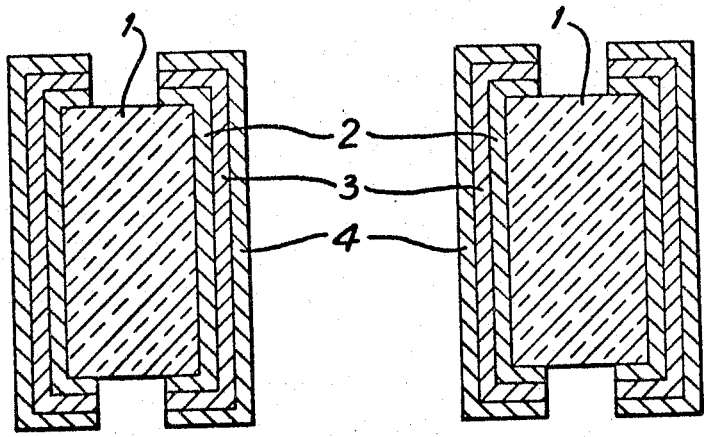
Figure 2:
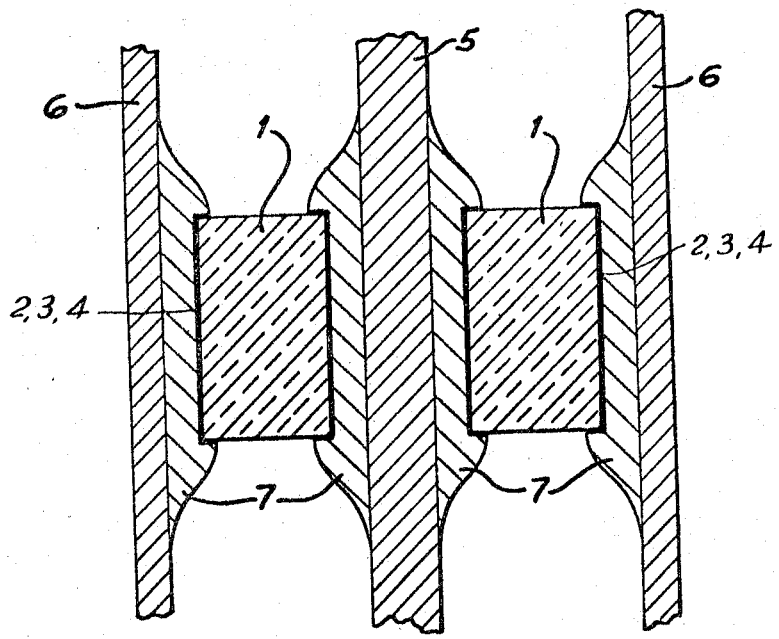

The invention will be described with greater particularity with reference to the accompanying drawing in which FIG. 1 shows in cross-section a portion of a cylindrical metallized ceramic body just prior to assembly with other metallic members; and, FIG. 2 shows in section a portion of a coaxial hermetic electrical lead-in assembly.

In the manufacture of coaxial seals useful as electrical lead-ins for evacuation or hermetically sealed devices, a section of ceramic 1 of tubular geometry is metallized by cathodic sputtering with successive layers of titanium 2, platinum 3 and stainless steel 4, as shown in FIG. 1. The details and manner in which the successive layers are cathodically sputtered onto the ceramic are described in greater detail in the parent application, Ser. No. 301,866.

The metal deposit may be excluded from certain areas by mechanical masking or alternatively may be removed from those areas in which metal is not desired by grinding, abrasion or etching. A metal member 5 is inserted into the center hole of the metallized ceramic and an external member 6 of stainless steel is positioned around the ceramic. The braze metal 7 is placed at the desired joint areas and the assembly heated in a non-oxidizing atmosphere such as hydrogen, cracked ammonia, or a vacuum to a temperature slightly in excess of the melting point of the braze metal, or alloy, and is heated at this temperature for a sufficient time to allow melting, wetting, and flow of the braze metal over the desired surfaces. The temperature is then lowered and the thus formed seal assembled into various devices by subsequent brazing at temperatures up to that which has been used for brazing the metallized ceramics to metal members.

The invention is not restricted to the particular materials described herein. Thus the internal conductor may be molybdenum or tungsten and the outer member stainless steel or low carbon steel and the braze metal copper, gold, nickel-gold alloys, and the like.

Therefore, while the invention has been described in reference to particular examples and applications thereof, it is not limited thereto as other modifications will be apparent to those skilled in the art. Consequently, the invention should be given the broadest interpretation consistent with the art.

What is claimed is:

1. An hermetic electrical lead-in assembly comprising a tubular ceramic member having a metallized inner surface portion constituted of successive layers of titanium, platinum and steel, and a conductive defractory metal member coaxial with the tubular ceramic member copper brazed to the metallized inner surface of the ceramic member.

2. An hermetic electrical lead-in assembly as claimed in claim 1 in which the ceramic is alumina.

3. An hermetic electrical lead-in assembly as claimed in claim 2 in which the coaxial member is molybdenum.

References Cited
UNITED STATES PATENTS

| | | | |
|---|---|---|---|
| 2,100,187 | 11/1937 | Handrek | 287—189.365 |
| 2,235,325 | 3/1941 | Möhrle et al. | 287—189.365 |
| 2,857,663 | 10/1958 | Beggs | 287—189.365 |
| 2,964,839 | 12/1960 | Marafioti et al. | 287—189.365 |
| 2,996,401 | 8/1961 | Welch et al. | 287—189.365 |
| 3,302,961 | 2/1967 | Franklin | 287—189.365 |
| 3,366,409 | 1/1968 | Milch | 287—189.365 |
| 3,418,423 | 12/1968 | Bronnes et al. | 287—189.365 |

DAVID J. WILLIAMOWSKY, Primary Examiner
WAYNE L. SHEDD, Assistant Examiner

PO-1050
(5/65)

UNITED STATES PATENT OFFICE
CERTIFICATE OF CORRECTION

Patent No. 3,464,725            Dated September 2, 1969

Inventor(s) Robert L. Bronnes, Richard C. Sweet, Ray C. Hughes

It is certified that error appears in the above-identified patent and that said Letters Patent are hereby corrected as shown below:

Col. 2, line 40, claim 1, line 4, "defractory" should be --refractory--.

Signed and sealed this 30th day of June 1970.

(SEAL)
Attest:

Edward M. Fletcher, Jr.
Attesting Officer

WILLIAM E. SCHUYLER, JR.
Commissioner of Patents